UNITED STATES PATENT OFFICE.

PAUL VOLKMANN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

AZO DYE.

935,830. Specification of Letters Patent. Patented Oct. 5, 1909.

No Drawing. Application filed April 30, 1909. Serial No. 493,123.

*To all whom it may concern:*

Be it known that I, PAUL VOLKMANN, doctor of philosophy, chemist, citizen of the German Empire, residing at Elberfeld, Germany, have invented new and useful Improvements in New Azo Dye, of which the following is a specification.

My invention relates to the manufacture of new yellow azo-dyes by combining 1-sulfoaryl-3-methyl-5-pyrazolones of the general formula:

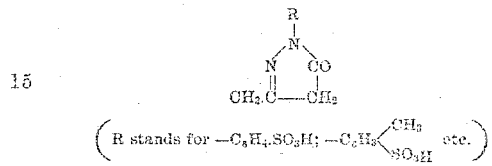

(R stands for —$C_6H_4SO_3H$; —$C_6H_3\genfrac{}{}{0pt}{}{CH_3}{SO_3H}$ etc.)

with the diazo compounds of toluidin sulfonic acids.

The new coloring matters thus obtained are after being dried and pulverized yellow powders soluble in water with a yellow color. They yield upon reduction with stannous chlorid and hydrochloric acid toluidin sulfonic acids and 1-sulfoaryl-3-methyl-4-amino-5-pyrazolones. They dye wool from acid baths yellow shades. My new dyes are characterized by their coloring power which is about three times stronger than that of the analogous anilin dyes; and by their fastness.

To illustrate my process, I can proceed as follows, the parts being by weight:—187 parts of 2-toluidin-5-sulfonic acid are diazotized and the diazo compound is added to a solution of 254 parts of 1-para-sulfophenyl-3-methyl-5-pyrazolone containing an excess of sodium carbonate. The mixture is stirred for 4 hours and the dye-stuff which precipitates is filtered off and dried.

It is an orange-yellow crystalline powder soluble in concentrated sulfuric acid with a yellow color. Upon reduction with stannous chlorid and hydrochloric acid the dye is decomposed, 2-toluidin-5-sulfonic acid and 1-para-sulfophenyl-3-methyl-4-amino-5-pyrazolone being obtained. It produces on wool bright yellow level shades, fast to light. In a similar manner coloring matters can be obtained on using other toluidin sulfonic acids *e. g.* 4-toluidin-2- or 3-sulfonic acid, 2-toluidin-4-sulfonic acid or 1-sulfotolyl-3-methyl-5-pyrazolones etc. The same dyestuffs can be obtained by at first preparing the dyes from arylmethylpyrazolones and then sulfonating the dyes thus obtained *e. g.* in the following way:—187 parts of 2-toluidin-5-sulfonic acid are diazotized and the diazo compound is then combined with an alkaline solution of 1-phenyl-3-methyl-5-pyrazolone. The dyestuff thus produced is then filtered off, washed, dried and introduced into 200 parts of monohydrated sulfuric acid. The mixture is heated to 85° C. for 4 hours, the mass of the reaction is poured on ice, the dye is salted out, pressed; the paste is neutralized with sodium carbonate and dried.

I claim:—

1. The herein-described new coloring matters obtainable from toluidin sulfonic acids and 1-sulfoaryl-3-methyl-5-pyrazolones, which are in dry state yellow powders soluble in water with a yellow color; yielding upon reduction with stannous chlorid and hydrochloric acid toluidin sulfonic acids and 1-sulfoaryl-3-methyl-4-amino-5-pyrazolones; and dyeing wool yellow shades, substantially as described.

2. The herein-described new coloring matter obtainable from 2-toluidin-5-sulfonic acid and 1-para-sulfophenyl-3-methyl-5-pyrazolone, which is in dry state an orange-yellow crystalline powder soluble in concentrated sulfuric acid with a yellow color; yielding upon reduction with stannous chlorid and hydrochloric acid 2-toluidin-5-sulfonic acid and 1-para-sulfophenyl-3-methyl-4-amino-5-pyrazolone; and dyeing wool bright yellow shades, substantially as described.

In testimony whereof I have hereunto set my hand in the presence of two subscribing witnesses.

PAUL VOLKMANN. [L. S.]

Witnesses:
 OTTO KÖNIG,
 C. J. WRIGHT.